United States Patent [19]

Kawamura et al.

[11] Patent Number: 4,974,092
[45] Date of Patent: Nov. 27, 1990

[54] AUTOMATIC FOCUSING DEVICE FOR A CAMERA ADOPTING LINEAR SAMPLING OF A VIDEO SIGNAL

[75] Inventors: Hisanobu Kawamura; Yoshiaki Nakayama, both of Tokyo, Japan

[73] Assignee: Fuji Photo Film Co., Ltd., Kanagawa, Japan

[21] Appl. No.: 353,251

[22] Filed: May 17, 1989

[30] Foreign Application Priority Data

May 17, 1988 [JP] Japan .................................. 63-118200
May 19, 1988 [JP] Japan .................................. 63-120659

[51] Int. Cl.⁵ .............................................. H04N 5/232
[52] U.S. Cl. .................................................. 358/227
[58] Field of Search ......................... 358/227, 224–225; 250/201 AF

[56] References Cited

U.S. PATENT DOCUMENTS 4,481,540 11/1984 Bergen .................................. 358/227
4,599,653 7/1986 Kimura et al. ...................... 358/227
4,614,975 9/1986 Kaite ..................................... 358/227
4,701,782 10/1987 Duvent ................................ 358/227
4,794,459 12/1988 Moberg et al. ..................... 358/227

Primary Examiner—Stephen Brinich

[57] ABSTRACT

An automatic focusing device for a camera includes a camera section in which an optical lens system having a variable focusing position and a driver for varying the focus of the lens system are built-in. A desired scene is picked up through the lens systems and converted into a video signal by raster scanning. A signal extracting section defines a plurality of sampling points which are arranged in a direction which intersects the scanning lines of the video signal. The signal extracting section receives the video signal and, when the raster scanning reaches any one of the sampling points, extracts and holds the video signal. A computing section is responsive to the held signal for determining a direction in which the focus of the lens system is to be varied. A control section controls the driver on the basis of the determined direction to vary the focus of the lens system in that direction.

44 Claims, 8 Drawing Sheets

AUTOMATIC FOCUSING DEVICE FOR A CAMERA ADOPTING LINEAR SAMPLING OF A VIDEO SIGNAL

BACKGROUND OF THE INVENTION

1. Field of the Invention

The present invention relates to an automatic focusing device for use in a camera.

2. Description of the Prior Art

An automatic focusing mechanism, or auto-focusing mechanism it is as often referred to, is built in many of modern video cameras or similar cameras of the type using a solid-state image sensor, such as a CCD (charge coupled device) array. A variety of approaches have heretofore been proposed to implement automatic focusing such as emitting an infrared ray, ultrasonic wave or similar radiation from a camera to a desired object and then determining the distance between the camera and the object on the basis of a reflection from the object which is incident to a built-in sensor of the camera; measuring the distance from a camera to an object by use of a range finder which adopts the principle of a trigonometrical survey; and using a particular component of a video signal which is representative of the contrast of a picture, i.e., contrast signal so as to determine a position where the contrast signal has the largest value to be the focus.

The auto-focusing mechanism using a contrast signal as stated above may be constructed to separate only a high-frequency component from an image signal, convert the high-frequency component into a DC level by peak-to-peak detection, and focus a lens system in such a manner as to maintain the signal produced by the conversion at the largest value at all times, as disclosed in Japanese Patent Laid-Open Publication No. 12615/1973 by way of example. The device disclosed in this Laid-Open Publication is mainly constituted by a local extraction circuit for extracting a video signal which appears in a particular focusing area which is defined on a picture plane, a circuit for producing a signal representative of a contrast from the extracted video signal by an arithmetic operation, and a servo mechanism for maintaining the largest value of the contrast signal by adjusting the focus of a lens. The local extraction of a video signal is accomplished by marking a certain area (usually a central area) of a single picture plane in the form of a rectangle or a circle, for example, the focus being adjusted by a video signal extracted from such an area.

The prior art method for the extraction of a video signal stated above is satisfactory so long as an object to be picked up has a pattern which bears a contrast distribution in the horizontal direction of a video signal, e.g. a vertical stripe pattern. However, it is not satisfactory when it comes to an object having a pattern which has a contrast distribution in the vertical direction, e.g. a horizontal stripe pattern. Further, since the focusing operation is performed in a video frequency band which is as high as 3 megahertz or 2 megahertz, for example, a processing circuit has to be implemented by high-speed operating elements which are undesirable from the standpoint of reliable operation and light-weight and miniature configuration of an auto-focusing device.

SUMMARY OF THE INVENTION

It is therefore an object of the present invention to provide an automatic focusing device for a camera which enhances accurate focusing when an object to be picked up has a contrast in the vertical direction.

It is another object of the present invention to provide an automatic focusing device for a camera which can be implemented by low-speed operating elements and, yet, perform accurate focusing.

An automatic focusing device of the present invention includes an image pick-up section in which an optical lens system having a variable focusing position and a driver for varying the focus of the lens system are built in. This section picks up a desired scene through the lens system and outputs a video signal representative of the scene by raster scanning. A signal extracting section is provided with a plurality of sampling points arranged in a direction which intersects the scanning lines of the video signal. When the raster scanning reaches any of the plurality of sampling points, the signal extracting circuit extracts and holds the video signal which is fed thereto. A computing section is responsive to the held signal for determining a direction in which the focus of the lens system is to be varied. A control section controls the driver on the basis of the determined direction to vary the focus of the lens system in that direction.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 1:
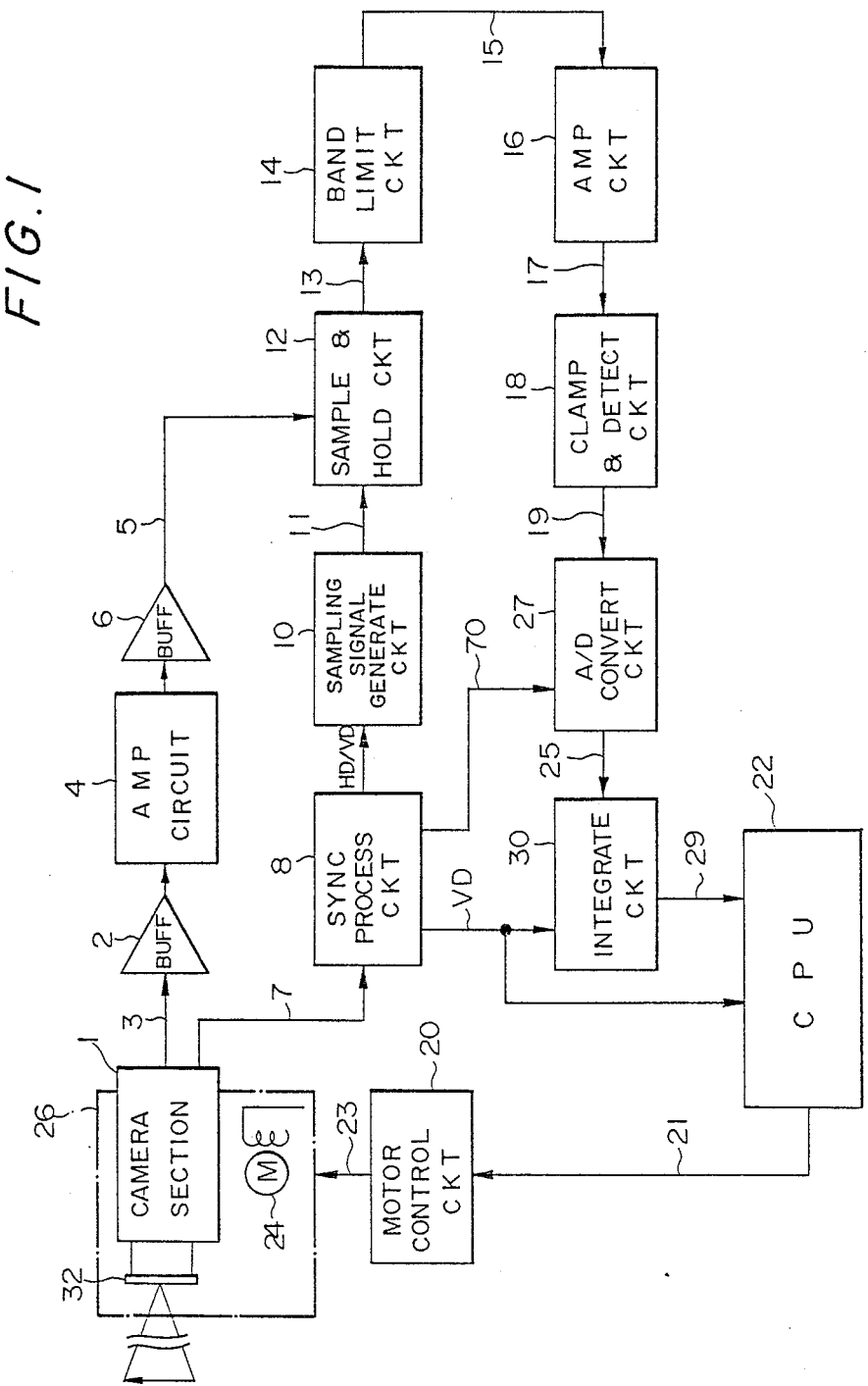
FIG. 1 is a schematic block diagram of an automatic focusing device for a camera embodying the present invention.
Figure 2:
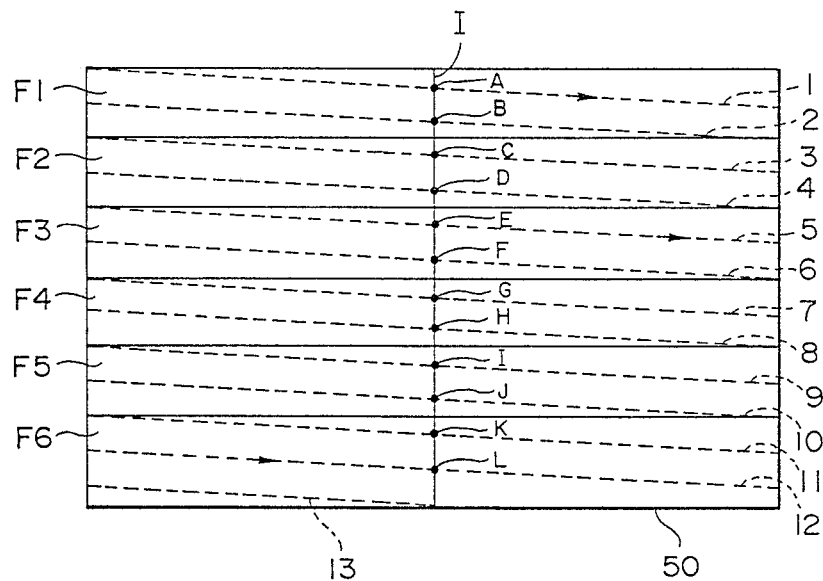
FIG. 2 is a front view of a picture plane representative of a video signal extracting portion which is defined in the embodiment of FIG. 1 and an alternative embodiment of FIG. 5, and zones wherein a video signal undergoes changes with respect to contrast.

Referring to FIG. 1 of the drawings, an automatic focusing or auto-focusing device embodying the present invention is shown which is applied to a video camera of the type using a solid-state imaging device by way of example. As shown, the auto-focusing device is basically comprised of a camera section 1 including an optical lens system 32, amplifying circuits 4 and 16, a synchronization processing section 8, a sampling signal generating circuit 10, a sampling and holding circuit 12, band limiting section 14, a clamping and detecting circuit 18, an analog-to-digital (AD) converting section 27, an integrating circuit 30, a central processing unit (CPU) 22, a motor control circuit 20, and an AF (Auto-Focus) motor 24. Under the control of the CPU 22, the auto-fucusing device effects various operations such as focusing of the lens 32 to a desired object. As shown in FIG. 2, in a picture plane 50 for the camera to pick up a scene, the focus is detected in a straight linear portion which is defined at substantially the intermediate position between opposite lengthwise ends of the picture plane 50 and extends substantially perpendicularly to the scanning lines of a video signal.

Referring again to FIG. 1, the camera section 1 has a solid-state imaging device (not shown) as well as the optical lens system 32. The camera section 1 converts a reflection from an object which is incident to the lens system 32 into a video signal and, in this particular embodiment, separates a luminance signal 3 and a composite synchronizing (sync) signal 7 from the video signal for a focus controlling purpose. The luminance signal 3 is fed via a buffer 2 to the amplifying circuit 4 to be amplified thereby. The amplified luminance signal coming out of the amplifying circuit 4 is applied via a buffer 6 to the sampling and holding circuit 12 which includes an analog switch.

On the other hand, the composite sync signal 7 from the camera section 1 is fed to the synchronization processing section 8. In response, the processing section 8 produces a vertical sync signal VD and a horizontal sync signal HD from the composite sync signal 7 while delivering the separated sync signals VD and HD to the sampling signal generating circuit 10. Simultaneously, the processing section 8 feeds the vertical sync signal VD to the integrating circuit 30 and CPU 22 while feeding an AD sampling clock 70 to the AD converting section 27. It is to be noted that when the camera section 1 is of the type having a sync signal separator, the sync signals VD and HD may be directly produced from the camera section 1.

The sampling signal generating circuit 10 is implemented as a logic circuit including an incremental counter, logical gate, analog switch, monostable multivibrator, etc. (not shown). Specifically, the sampling signal generating circuit 10 compares, in response to the horizontal sync signal HD, actual horizontal scanning conditions during operation of the camera with predetermined values which are representative of the positions of sampling points on the picture plane 50 (FIG. 2) in the horizontal direction while comparing, in response to the vertical sync signal VD, actual vertical scanning conditions with predetermined values which are representative of the positions of the sampling points on the picture plane 50 in the vertical direction. Every time the actual horizontal and vertical scanning conditions indivdually coincide with their associated predetermined values, the circuit 10 generates a sampling clock pulse 11, as indicated by a waveform (B) in FIG. 4 by way of example. The sampling clock pulses 11 are fed to the sampling and holding circuit 12 to serve as a sampling timing signal.

In response to every sampling clock pulse 11, the sampling and holding circuit 12 holds the instantaneous DC value of the luminance signal 5 which is fed thereto from the buffer 6. More specifically, the sampling and holding circuit 12 samples a luminance value at a sampling point on the picture plane 50 and holds it until it receives another DC value of the luminance signal 5 in response to the subsequent sampling clock pulse 11. The held value is outputted via an output 13 of the circuit 12.

The band limiting section 14 is implemented by a band-pass filter (BPF) responsive to a frequency band of 500 hertz to 7.5 kilohertz, i.e., it serves to pass only necessary frequency components while removing a replica false signal or folding noise and other needless signals. The BPF transforms the sampled luminance signal into a signal which lies in an audio frequency band. The band limiting may alternatively be implemented by processing of the kind using a digital filter which would further simplify the circuitry.

The amplifying circuit 16 amplifies a signal 15 coming out of the band limiting section 14 to a necessary level. The clamping and detecting circuit 18 clamps the amplified signal at a particular level while detecting it with a particular time constant to thereby produce a DC component.

The AD converting section 27 is responsive to an AD sampling clock 70 which is fed thereto from the synchronization processing section 8. Timed to the AD sampling clock 70, the AD converting section 27 converts an input signal 19 from the clamping and detecting circuit 18 to, for example, a 6-bit or 8-bit digital signal 25. This digital signal 25 is routed to the integrating circuit 30.

The integrating circuit 30 integrates the digital signals 25 from the AD converting section 27 during one vertical scanning (1 V) period and latches the resulting signal 29. The latched signal 29 is fed to the CPU 22 in the form of AF evaluation data. Upon completion of the latching, the integrating circuit 20 is reset to start on the integration of the next field.

The CPU 22 receives a signal 29 representative of the latched AF evaluation data from the integrating circuit 30 and compares it with the immediately preceding AF evaluation data being stored in the CPU 22. The CPU 22 determines, on the basis of the result of comparison, a direction for driving the AF motor 24 such that the value of the AF evaluation data increases, and then delivers an AF motor control signal 21 to the motor control circuit 20. The motor control circuit 20 rotates the motor 24 by a predetermined amount in a direction which is associated with the AF motor control signal 21, as will be described in detail later. As soon as the AF motor 24 stops rotating, the CPU 22 takes in the next AF evaluation data from the integrating circuit 30 and then performs the above-described operation. Such a procedure is repeated until the AF evaluation data reaches the largest value.

In response to the AF motor control signal 21, the motor control circuit 20 feeds, to a functional operation circuit 26, a current 23 for driving the AF motor 24. In the functional operation circuit 26, the current 23 drives the AF motor 24 motor 24 which in turn moves the lens system 32 forwardly or backwardly on the optical axis of the system 32 and through an AF ring or similar interlocking member.

The focusing operation of the auto-focusing device shown in FIG. 1 will be described more specifically with reference to FIGS. 2 and 4. To facilitate an understanding of the illustrative embodiment, as shown in FIG. 2, it is assumed that the number of horizontal scanning lines is thirteen, that the luminance signal is sampled at twelve points A to L which are defined on a vertical line I on the picture plane 50, and that the sampling is performed on a field basis. It is to be noted that in an actual camera only a single sampling point suffices per horizontal scanning (1H), i.e., 262 or 263 sampling points suffice when the number of scanning lines per field is 262.5, for example. Alternatively, the sampling may even be performed at one point on each of a sequence of horizontal scanning lines or only in a central area of the picture plane 50.

For the purpose of illustrating the samping operation, assume that the picture plane 50 is made up of six consecutive zones F1, F2, F3, F4, F5 and F6 as named from the top to the bottom of the picture plane 50 and is representative of a pattern having a contrast distribution in a relationship of F1 (=F4)<F2 (=F5)<F3 (=F6).

When a person manipulates a switch or similar inputting device (not shown) of the camera for entering a shoot start command, the camera starts a shooting operation which begins with processing of a signal associated with the first field and is outputted by the camera section 1. Specifically, the camera section 1 converts a reflection from an object which is incident to the lens system 32 into a composite video signal, and separates the luminance signal 3 and comprise sync signal 7 from the composite video signal. The luminance signal 3 is fed to the amplifying circuit 4 via the buffer 2, and the amplified output of the amplifying circuit 4 is fed out via the output 5 of the buffer 6 to the sampling and holding circuit 12. The composite sync signal 7 is applied to the synchronization processing section 8.

The synchronization processing section 8 separates the horizontal sync signal HD and vertical sync signal VD from the composite sync signal 7. In response to the horizontal and vertical sync signals HD and VD, the sampling signal generating circuit 10 compares actual scanning conditions in the horizontal direction with predetermined values of the sampling points on the picture plane 50 in the horizontal direction while comparing actual scanning conditions in the vertical direction with predetermined values of the sampling points in the vertical direction. When the actual scanning timing reaches the sampling point A defined on the line I, the circuit 10 feeds a sampling clock pulse 11 to the sampling and holding circuit 12. In response, the circuit 12 samples and holds a luminance signal 5 which has been entered from the buffer 6 at that time. More specifically, while the first field is sequentially scanned from the upper left to the lower right of the picture plane 50, a luminance signal 5 is sampled and held when the sampling point A defined on the first scanning line of the first field is reached. Subsequently, a luminance signal 5 is sampled and held when the samping point B on the second scanning line of the first field is reached. In this manner, the luminance signal 5 is sequentially sampled at the sampling points A to L which are defined on the successive scanning lines of the first field.

Figure 4:
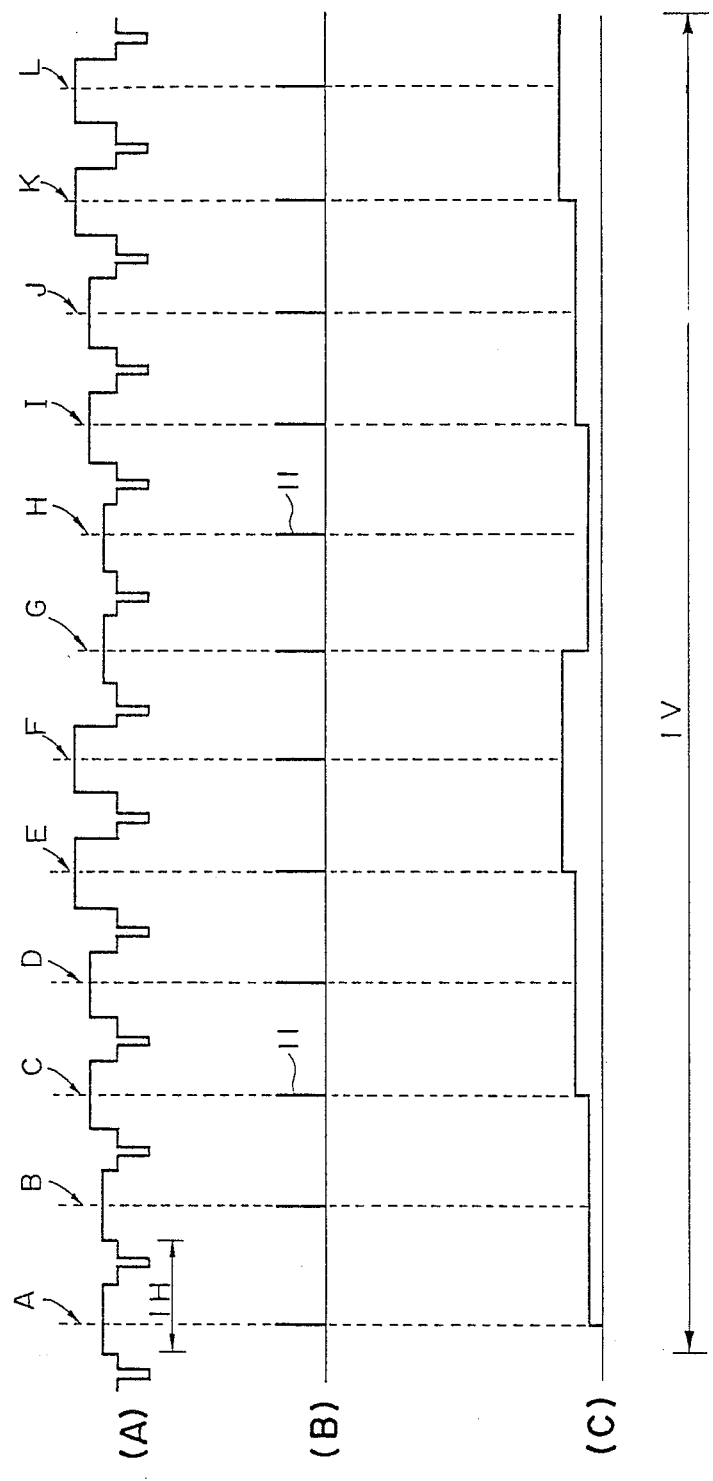
FIG. 4 is a diagram showing the waveforms of signals which demonstrate the operation of the embodiment shown in FIG. 1.

The operation of the sampling and holding circuit 12 will be better understood with reference to FIG. 4. Specifically, FIG. 4 shows a waveform (A) of a video signal appearing during one field (1 V) period, a timing signal (B) adapted for sampling, and a waveform (C) illustrating how a signal sampled by the sampling and holding circuit 12 is held until the arrival of the next sampling clock pulse. As shown, the circuit 12 holds a DC value appearing when the first sampling clock pulse in the field is generated, i.e., a DC value associated with the sampling point A and, in response to the next sampling clock pulse, holds a DC value associated with the sampling point B. By such a procedure, the circuit 12 sequentially updates the held value 1H by 1H over the entire 1 V period.

The signal 13 sampled and held by the sampling and holding circuit 12 is applied to the band limiting section 14 so that only a necessary frequency band of the signal 13 is produced in the form of a signal 15. The signal 15 is routed through the amplifying circuit 16 and clamping and detecting circuit 18 to the AD converting section 27. The AD conversion section 27 converts the input signal 19 into a 6-bit or 8-bit digital signal 25, for example, and delivers the digital signal 25 to the integrating circuit 30.

The integrating circuit 30 integrates and latches the video signal data obtained at the twelve consecutive sampling points A to L. The CPU 22 takes in AF evaluation data which is the result of integration from the integrating circuit 30, performs an arithmetic operation with the AF evaluation data, and drives the AF motor 24 based on the result of the arithmetic operation so as to control the focusing lens of the lens system 32. This kind of control is generally referred to as peak detection tracking servo. The AF motor 24 is controlled such that the AF evaluation data becomes largest, on the basis of the above-stated arithmetic operations.

The various operations particular to the above embodiment such as the field-by-field or frame-by-frame separation of signals, the computation of AF evaluation data and the arithmetic operation with the AF evaluation data performed by the CPU 22 are repeated until one stops shooting the scene.

In the illustrative embodiment, a focus detecting region is defined in a linear configuration at substantially the intermediate position between the opposite lengthwise ends of the picture plane 50 and substantially perpendicularly to the scanning lines of a video signal. This is successful in enhancing accurate focusing even when a desired object has a pattern bearing contrasts in the vertical direction. It is noteworthy that since the illustrative embodiment uses only one sampling point per 1H, the focus processing can be effected in a low frequency band or audio band and therefore by an extremely simple processing circuit.

Figure 3:
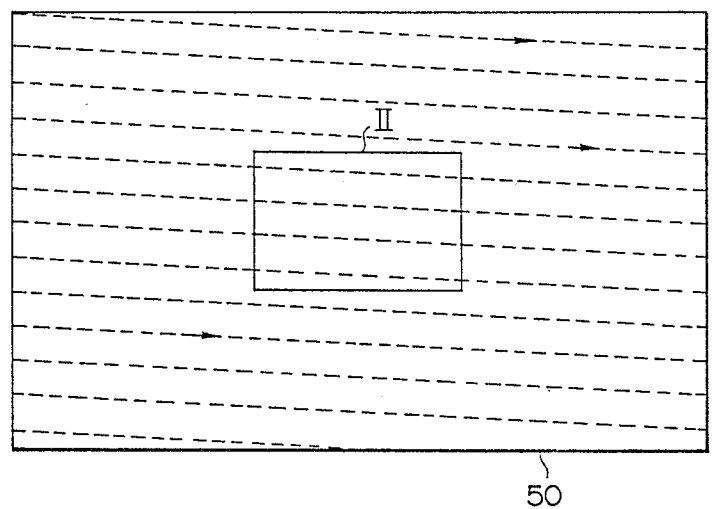
FIG. 3 is a front view of a picture plane explanatory of another video signal extracting portion which the embodiment of FIG. 5 uses in combination with the extracting portion shown in FIG. 2.
Figure 5:
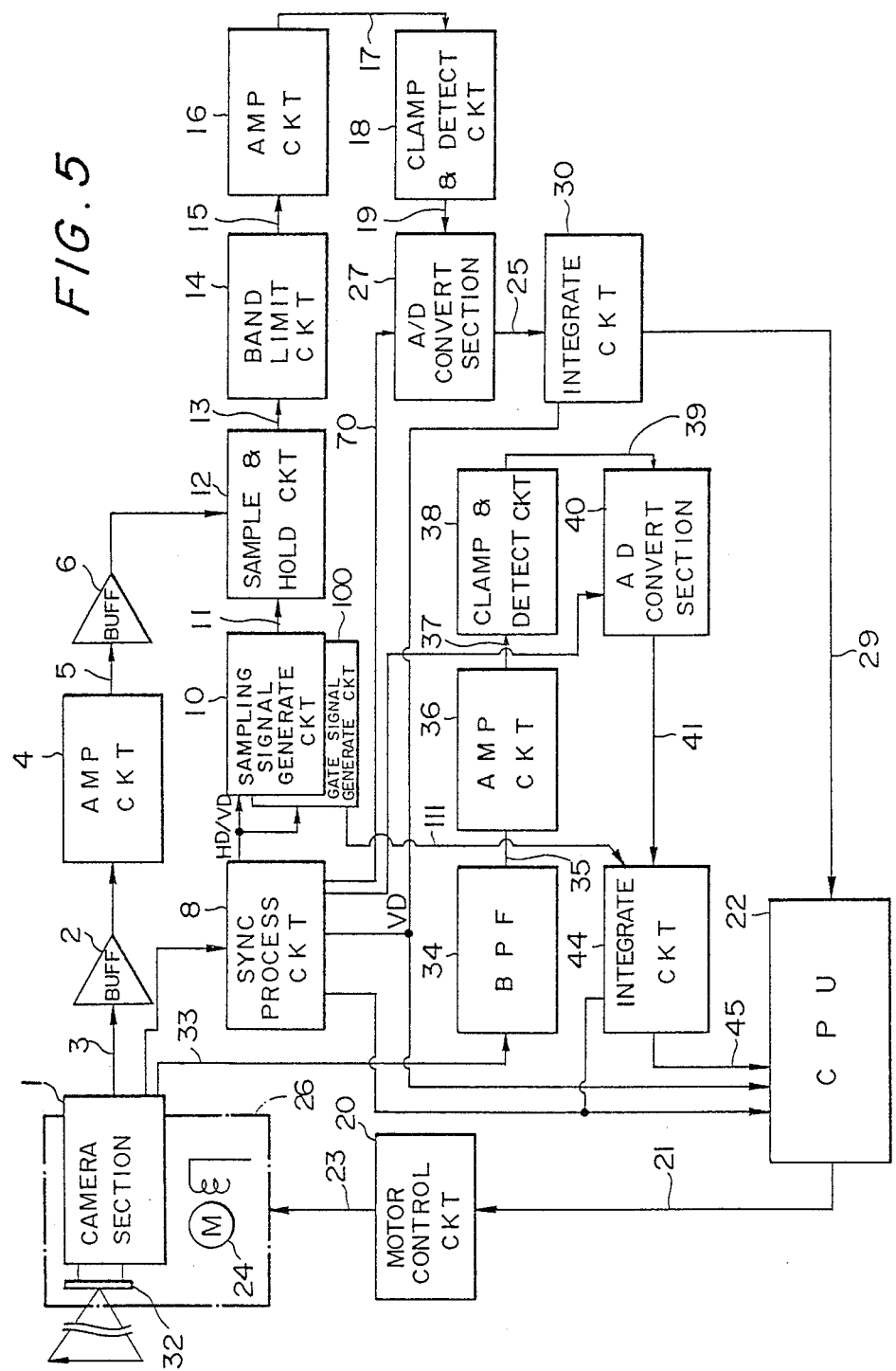
FIG. 5 is a schematic block diagram showing an alternative embodiment of the automatic focusing device in accordance with the present invention.

Referring to FIG. 5, an alternative embodiment of the auto-focusing device in accordance with the present invention is shown. This particular embodiment is constructed by combining the above-described unique auto-focusing technique with the prior art auto-focusing technique so as to cope with both of a horizontal and a vertical contrast distribution of a video signal. Briefly, the auto-focusing device shown in FIG. 5 focuses the lens system 32 by sampling the video signal at the twelve points A to L defined on the line I and in a rectangular area II shown in FIG. 3 which is defined at substantially the center of the picture plane 50.

In FIG. 5, the device has a gate signal generating circuit 100, a band-pass filter (BPF) 34, an amplifying circuit 36, a clamping and detecting circuit 38, an AD converting section 40, and an integrating circuit 44 in addition to the various elements which are included in the embodiment of FIG. 1. The gate signal generating circuit 100 generates a clock 111 for causing the integrating circuit 44 to integrate signals which are contained in the rectangular area II (FIG. 3) of the picture plane 50. The BPF 34 receives the luminance signal 33 from the camera section I and separates a band-limited video signal of a high-frequency component from the luminance signal 33. The amplifying circuit 36 amplifies the band-passed video signal 35 to produce an amplified signal 37. The clamping and detecting circuit 38, like the clamping and detecting circuit 18, detects the input signal 37 from the amplifying circuit 36 and outputs the resulting signal 39. The AD converting section 40 converts the signal 39 into, for example, a 6-bit or 8-bit digital signal 41 and delivers the digital signal 41 to the integrating circuit 44. The integrating circuit 44 integrates and latches 1 V of digital signals which appear in the area II of the picture plane 50, applying its output 45 to the CPU 22.

Figure 6:
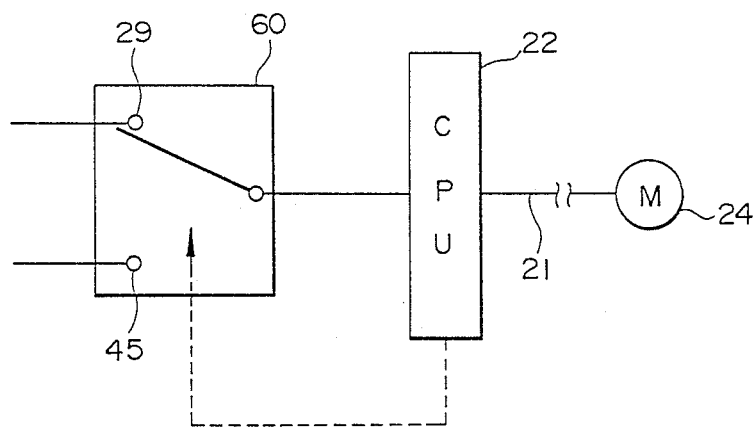
FIG. 6 is a block diagram schematically showing a specific construction of a switch installed in a modified form of the embodiment of FIG. 5 for selectively inputting two different AF (Auto-Focus) evaluation data.

The CPU 22 recives the signal 29 which has been sampled and held at the sampling points A to L on the line I which is defined on the picture plane 50 and then integrated by the integrating circuit 30, as in the embodiment shown in FIG. 1. The CPU 22 compares the signal 29 with the integrated output 45 of the integrating circuit 44. For example, assume that an arrangement is made such that data represented by one signal 45 has priority over data represented by the other signal 29. Then, when the level of the signal 45 is lower than a predetermined level, a focusing operation is performed on the peak detection tracking servo basis by using the data of the other signal 29. As soon as the level of the signal 45 reaches the predetermined level, the focusing operation is continued by using the data of the signal 45. Alternatively, as shown in FIG. 6, a switch 60 may be disposed upstream of the CPU 22 and actuated by the CPU 22 to select either one of the signals 29 and 45. In any case, the CPU 22 performs the peak detection tracking servo type control by using the signal 29 or the signal 45 being inputted thereto.

As stated above, in the embodiment of FIG. 5 or the modification thereof shown in FIG. 6, the focusing operation uses a video signal sampled and held at a plurality of sampling points on a line which is defined at substantially the intermediate position between the opposite lengthwise ends of the picture plane 50 and substanially perpendicularly to the scanning lines of a video signal, and a video signal extracted in a rectangular area which is defined at substantially the center of the picture plane 50. The focusing device is therefore capable of coping with both of a horizontal and a vertical contrast distribution of a video signal and thereby promoting accurate focusing. While the particular area II on the picture plane 50 has been shown and described as being rectangular, it may be configured in a circle or any other suitable shape or even in a line.

Any of the embodiments shown and described is applicable not only to a video camera implemented by a solid state imaging device but also to a video still camera or similar imaging apparatus implemented by a solid state image sensor.

In accordance with the present invention, a region for detecting the focus extends substantially perpendicularly to the scanning lines of a video signal, so that the focusing accuracy is increased when a desired object has a vertical contrast distribution.

Further, in accordance with the present invention, the focusing operation is implemented by a video signal sampled at multiple sampling points which are arranged substantially perpendicularly to the scanning lines of a video signal, and a video signal sampled at multiple sampling points which are arranged substantially in parallel with the scanning lines. This promotes accurate focusing for both of a horizontal and a vertical contrast distribution of a video signal.

Figure 7:
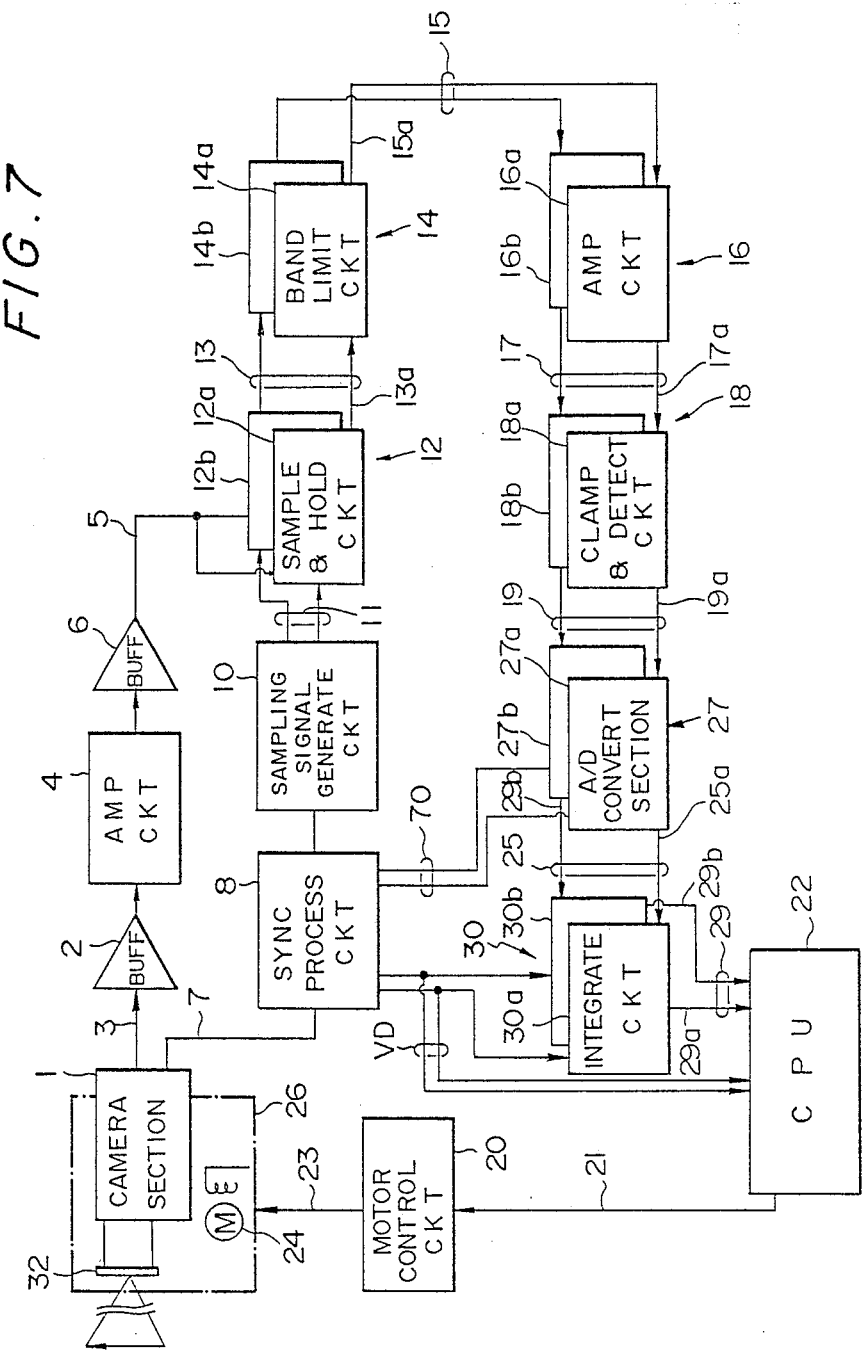
FIG. 7 is a schematic block diagram showing a further alternative embodiment of the automatic focusing device in accordance with the present invention.

Referring to FIG. 7, another alternative embodiment of the auto-focusing device in accordance with the present invention is shown. In the figure, similar components or structural elements are designated by the same reference numerals, and redundant description will be omitted for simplicity.

The device shown in FIG. 7 is advantageously applicable to a so-called interlace type system in which a picture is constituted by a first field or odd field and a second field or even field. In this particular embodiment, each of the sampling and holding circuit 12, band limiting section 14, amplifying circuit 16, clamping and detecting circuit 18, AD converting section 27 and an integrating circuit 30 are made up of two independent parts, one of each being assigned to the odd field and the other to the even field, as represented by amplifying circuits 16a and 16b by way of example. Alternatively, an arrangement may be made such that the two systems of such circuit blocks are switched over by a timing signal to process the first and second fields. The CPU 22 then compares fetched data at every 1 VD (i.e. skippingly) in response to every vertical sync signal VD. In the description to follow, suffixes "a" and "b" added to the reference numerals are representative of a circuit or procesing section assigned to the first field and a circuit or processing section assigned to the second field, respectively.

Figure 8:
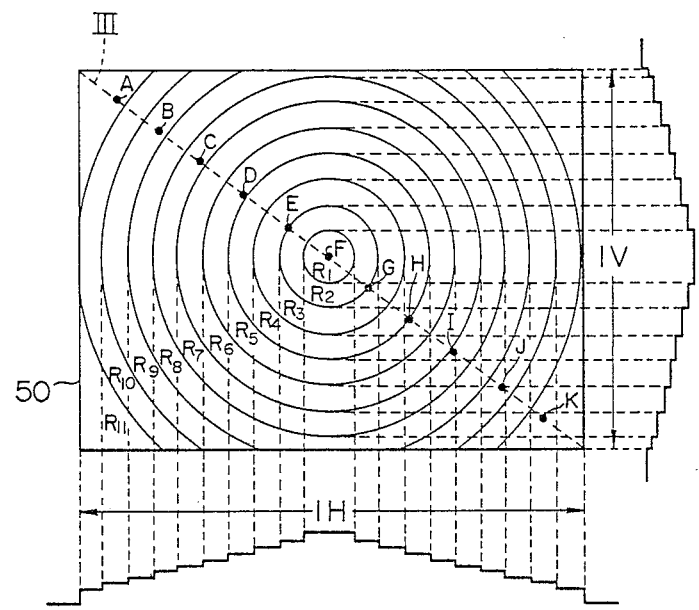
FIGS. 8 and 9 are front views of a picture plane showing in combination sampling points which are assigned to a sampling and holding circuit included in the arrangement of FIG. 7, and concentric zones wherein a video signal undergoes changes in contrast.
Figure 9:
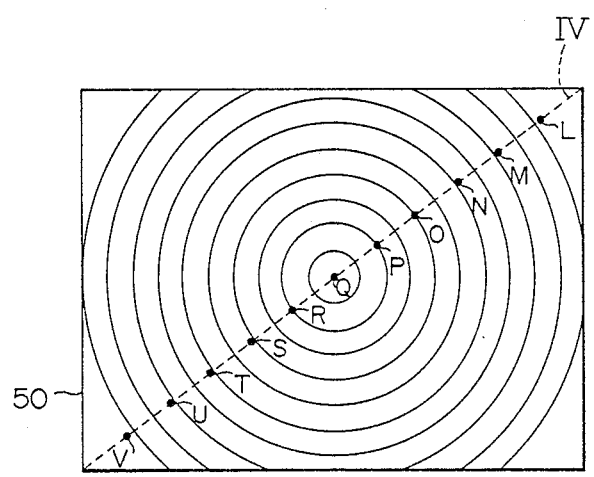

As shown in FIGS. 8 and 9, the embodiment of FIG. 8 detects the focus at points which are defined on diagonals of the picture plane 50 associated with a scene to be shot. Therefore, as shown in FIGS. 8 and 9, the luminance signal is sampled and held at predetermined sampling points A to V which are defined on diagonals III and IV of the picture plane 50. The sampling and holding on the diagonal line III shown in FIG. 8 is sequentially effected from the upper left to the lower right of the picture plane 50 in the first or odd field. On the other hand, the sampling and holding on the diagonal IV shown in FIG. 9 is sequentially effected from the upper right to the lower left of the picture plane 50 in the second or even field which constitutes the same picture plane 50 as the odd field. For the ease of description, assume that the number of horizontal scanning lines is eleven in both of the first and second fields, and that the luminance signal is sampled and held at eleven sampling points A to K on the diagonal III and at eleven sampling points L to V on the diagonal IV. In practice, one sampling point suffices for 1H. For example, assuming that the number of scanning lines per field is 262.5, either 262 or 263 sampling points suffices. Of course, one sampling point may be defined for a pluality of H's, and the sampling may be performed only in a central area of the picture plane 50.

For the purpose of discussing the sampling operation, it is assumed that the picture plane 50 is divided into eleven concentric zones R1 to R11 which are sequentially defined in this order and extend radially outward from the center of the picture plane 50, the contrast being most intense in the region R1 and sequentially decreasing toward the region R11. When the picture plane 50 is seen in the vertical direction (1 V period) and the horizontal direction (1H period), a video signal appears as shown respectively in a right part and a left part of FIG. 8 for better understanding the contrast distribution.

In this particular embodiment, as a shooting operation begins, the focusing device starts processing a signal associated with the first field and outputted by the camera section 1. The camera section 1 converts a reflection from an object which is incident to the lens system 32 to a video signal and separates a luminance signal 3 and a composite sync signal 7 from the video signal for focus controlling. The luminance signal 3 is fed via the buffer 2 to the amplifying circuit 4 to be amplified thereby. The amplified luminance signal coming out of the amplifying circuit 4 is applied via the buffer 6 to a sampling and holding circuit 12a which is assigned to the first field. The composite sync signal 7 is applied to the synchronization processing section 8.

On the other hand, the composite sync signal 7 fed to the synchronization processing section 8 is separated into a vertical sync signal VD and a horizontal sync signal HD. The sampling signal generating circuit 10 compares, in response to the horizontal and vertical sync signals HD and VD, actual horizontal scanning conditions during operation of the device with predetermined values which are representative of the positions of sampling points on the picture plane 50 in the horizontal direction while comparing actual vertical scanning conditions with predetermined values which are representative of the positions of the sampling points in the vertical direction. As the scanning timing reaches the sampling point A on the diagonal III defined on the picture plane 50, a sampling clock pulse 11 is fed to the sampling and holding circuit 12a which is associated with the first field.

In response to every sampling clock pulse 11, the sampling and holding circuit 12a holds the instantaneous value of the luminance signal 5 which is fed thereto from the buffer 6. More specifically, the sampling and holding circuit 12a samples and holds the signal 5 when the sampling point A, defined on the first scanning line of the first field, is reached while the first field is scanned from the upper left toward the lower right. Subsequently, when the sampling point B on the second scanning line of the first field is reached, the sampling and holding circuit 12a holds the instantaneous value of the luminance signal 5. In this manner, the luminance signal 5 is sampled and held at the sampling points A to K which are defined on the scanning lines of the first field.

Figure 10:
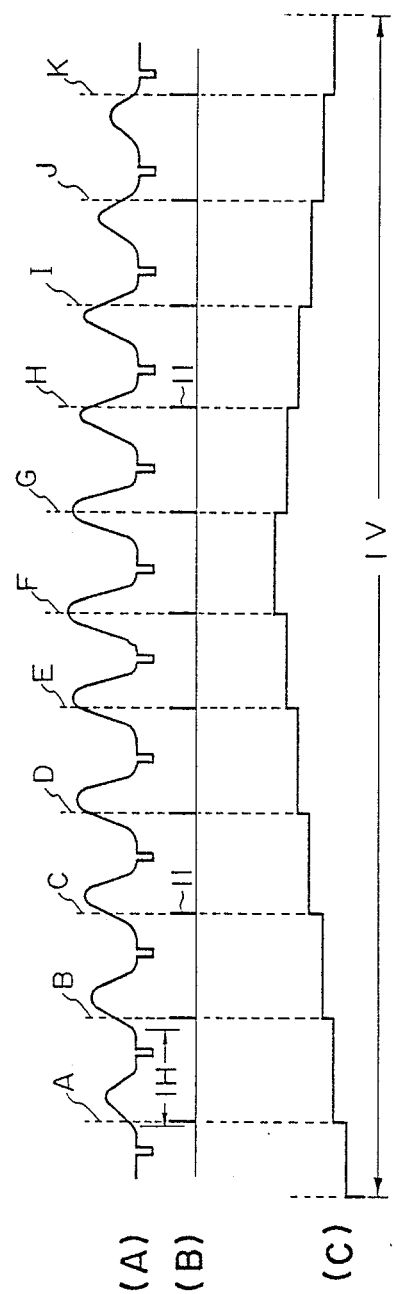
FIG. 10 is a waveform diagram representative of the operation of the embodiment shown in FIG. 7.

The operation of the sampling and holding circuit 12a will be better understood with reference to FIG. 10. Specifically, FIG. 10 shows a waveform (A) of a video signal appearing during one field (1 V) period, a timing signal (B) adapted for sampling, and a waveform (C) illustrating how a signal sampled by the sampling and holding circuit 12a is held until the arrival of the next sampling clock pulse. As shown, the circuit 12a holds a DC value appearing when the first sampling clock pulse is generated on the first scanning line of the first field, i.e., a DC value associated with the sampling point A and, in response to the next sampling clock pulse associated with the sampling point B, holds a Dc value at the sampling point B. By such a procedure, the circuit 12 sequentially updates the held value 1H by 1H over the entire 1 V period.

The signal 13a sampled and held by the circuit 12a is applied to a band limiting section 14a so that only a necessary frequency band of the signal 13a is produced in the form of a signal 15a. The signal 15a is routed through an amplifying circuit 16a and a clamping and detecting circuit 18a to an AD converting section 27a. The AD converting section 27a converts the input signal 19a into a 6-bit or 8-bit digital signal 25a, for example, and delivers the digital signal 25a to an integrating circuit 30a. The integrating circuit 30a integrates and latches the video signal data obtained at the sampling points A to K of the first field.

The signal processing procedure described above is also executed with the second field which is outputted by the camera section 1. Specifically, video signal data in the second or even field are sampled and held at the eleven sampling points L to V defined on the other diagonal IV which extends from the upper right to the lower left of the picture plane 50. Various operations associated with the second field such as the generation of video signal data, amplification, detection and movement of the lens system 32 are similar to those which are associated with the first field except for the use of an exclusive sampling and holding circuit 12b, a band limiting section 14b, an amplifying circuit 16b, a clamping and detecting circuit 18b, an AD converting section 72b, and an integrating circuit 30b.

The integrating circuit 30b integrates and latches video signal data which are produced at the sampling points L to V of the second field. The CPU 22 takes in AF evaluation data in the form of signals 29a and 29b which are respectively latched in the integrating circuits 30a and 30b, and compares them with AF evaluation data occurring two fields before and being stored in the CPU 22. As soon as the AF evaluation data are fully read by the CPU 22, the integrating circuits 30a and 30b are reset to individually prepare for the integration of the next fields. Based on the result of comparison, the CPU 22 controls the AF motor 24 such that the value of the AF evaluation data becomes larger, as in the embodiment of FIG. 1. Upon completion of the drive of the AF motor 24, the CPU 22 takes in the next AF evaluation data from the integrating circuits 30a and 30b with respect to the next two fields, and then repeats the above procedure until the AF evaluation data becomes largest.

As described above, in the illustrative embodiment, video signals individually associated with the first or odd field and the second or even field are sampled on substantially perpendicular arrays of sampling points. Focusing is accomplished by comparing the AF evaluation values of the first fields and those of the second fields independently of each other. This promotes accurate focusing even if an object has a contrast distribution in a particular direction only.

While the AF evaluation values have been described as being computed by sampling video signals field by field, the sampling and computation may alternatively be effected on a frame-by-frame basis. For such an alternative approach, the sampling signal generating circuit 10 delivers one frame (2 V) of timing signal to the integrating circuit 30 and CPU 22, while the integrating circuit 30 integrates and latches one frame of sampling data, i.e., video signal data produced at the twenty-two sampling points A to V of the first and second fields as shown in FIG. 7. The CPU 22 compares one frame of AF evaluationd data fetched from the integrating circuit 30 with one frame of AF evaluation data being stored in the CPU 22.

In summary, in accordance with the present invention, a focusing portion of a picture plane is defined in the form of a line and not in the form of a plane, so that the sampling and holding circuit 12 generates a signal at only one point in 1H. Sampled video signals can therefore be processed in the audio frequency band. This simplifies the processing circuit, enhances reliable operations of the auto-focusing device and, yet, promotes light-weight and miniature configuration of the device. Since different sampling points are defined for each of the first and second fields and the sampled signals are integrated and compared on a field basis or on a frame basis, accurate forcing operations are achievable. Such sampling and comparing operations are repeated until one finishes shooting, thereby further enhancing accurate forcing operations.

In the embodiment of FIG. 7, the sampling poitns are defined on the diagonals of the picture plane 50. Alternatively, they may be defined on any other suitable contour such as a circle or a rhombus having a gradient which intersects the horizontal scanning lines, or a combination thereof. In such a case, it is of course necessary that a single sampling point or a plurality of thinned sampling points be provided in a linear configuration, as distinguished from a planar configuration.

Since the present invention effects the focusing operations in the audio frequency band and not in the video frequency band, the output signal of the integrating circuit 30 may be directly fed to a sounding element to inform a person of the focusing condition by an audible message.

Effecting the focus processing in the audio frequency band which is lower than the video frequency band is successful in simplifying the processing circuit and, therefore, it is further successful in realizing a reliable, light weight, and miniature auto-focusing device.

Further, a different combination of sampling points is assigned to each of the first or odd field and the second or even field, and the sampled points are integrated and compared field by field or frame by frame as the case may be. This kind of approach promotes accurate focusing.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An automatic focusing apparatus comprising:
   image pick-up means, including an optical lens system having a variable focusing position and driving means for varying said focusing position of said optical lens system, for raster scanning a desired scene through said optical lens system and outputting a video signal representative of said scene;
   signal extracting means for receiving the video signal and extracting and holding the video signal when the raster scanning reaches any one of a plurality of first sampling points arranged in a direction intersecting scanning lines of the video signal;
   computing means responsive to the sampled and held signal for determining a direction in which the focusing position of said optical lens system is to be varied; and
   control means for controlling said driving means on the basis of the determined direction to vary the focusing position of said optical lens system in said direction.

2. The apparatus of claim 1, wherein said plurality of first sampling points are linearly arranged in a direction intersecting the scanning lines of the video signal.

3. The apparatus of claim 2, wherein said plurality of first sampling points are linearly arranged in a direction substantially perpendicular to the scanning lines of the video signal.

4. The apparatus of claim 1, wherein said signal extracting means comprises:
   sampling signal generating means for generating, in synchronism with the video signal, a sampling signal which defines each of the plurality of first sampling points;
   sampling and holding means for receiving the video signal and, in response to the sampling signal, sampling and holding said video signal; and
   integrating means for integrating and holding the sampled and held video signal over a vertical scanning period of the video signal;
   said computing means determining the direction for varying the focusing position of said optical lens system by comparing the held video signal with a predetermined signal which is associated with a preceding vertical scanning period.

5. The apparatus of claim 4, wherein said signal extracting means includes frequency band limiting means for limiting a frequency band of the sampled and held signal to a low frequency band and then delivering said band limited signal to said integrating means.

6. The apparatus of claim 1, wherein said signal extracting means extracts and holds the video signal when the raster scanning reaches any one of a plurality of second sampling points defining an area which forms a portion of a picture plane of the scene represented by the video signal.

7. The apparatus of claim 6, wherein said signal extracting means includes:
   sampling signal generating means for generating, in synchronism with the video signal, a sampling signal for defining each of the plurality of first sampling points;
   sampling and holding means for receiving the video signal and, in response to the sampling signal, sampling and holding said video signal;
   first integrating means for integrating and holding the sampled and held video signal over a vertical scanning period of the video signal;
   gate signal generating means for generating, in synchronism with the video signal, a gate signal which defines each of the plurality of second sampling points; and
   second integrating means for receiving the video signal and, in response to the gate signal, integrating and holding said video signal over a vertical scanning period of the video signal;
   said computing means determining the direction for varying the focusing position of said optical lens system by comparing the video signals held by said first and second integrating means with predetermined signals which are individually associated with said held video signals and occurred during a proceding vertical scanning period.

8. The apparatus of claim 1, wherein the video signal includes a frame constituted by a pair of interlaced fields;
   said signal extracting means extracting and holding, for each of the pair of interlaced fields, the video signal when the raster scanning reaches any one of a plurality of first sampling points;
   said computing means determining the direction for varying the forcusing position of said optical lens system in response to the held video signals, each being associated with a respective one of the pair of fields.

9. The apparatus of claim 8, wherein said computing means determines the direction for varying the focusing positions of said optical lens system by comparing, for each of the pair of fields, the held video signal with a predetermined preceding signal of the associated field.

10. The apparatus of claim 8, wherein said computing means determines the direction for varying the focusing position of said optical lens system by comparing the held video signal associated with a frame with a predetermined preceding signal of the associated frame.

11. The apparatus of claim 8, wherein said plurality of first sampling points, for each of the pair of fields, are linearly arranged in different directions.

12. The apparatus of claim 11, wherein said plurality of first sampling points, for each of the pair of fields, are linearly arranged in intersecting lines which are individually associated with each one of the pair of fields, respectively.

13. The apparatus of claim 12, wherein each of said plurality of first sampling of points, for each of the pair of fields are linearly arranged on opposing intersecting substantially diagonal lines of the picture plane of the scene represented by the video signal.

14. The device of claim 8, wherein said signal extraction means includes a pair of signal extracting means, each associated with respective one of the pair of fields for, when the raster scanning reaches any one of the plurality of first sampling points associated with each respective one of the pair of fields, extracting and holding the video signal of the associated field.

15. An automatic focusing apparatus, comprising:
   scanning means, including an optical lens system with a plurality of variable focusing positions and drive means for varying the focusing position of said optical lens system, for raster scanning, with a plurality of scan, lines, a desired scene through said optical lens system and for generating and separating a video signal, representative of said desired scene, into a luminance signal and a synchronizing signal, and outputting said signals;
   temporary storage means operatively connected to said scanning means, for receiving and temporarily storing said luminance signal;
   sample signal generating means, operatively connected to said scanning means, for receiving said synchronizing signal and for comparing said synchronizing signal, representative of actual scanning conditions of the scanning means, to a predetermined plurality of linearly arranged sampling points to generate and output sampling signals, one sampling signal output upon each of said plurality of scan lines intersecting one of said plurality of linearly arranged sampling points;
   sample and hold means, operatively connected to said temporary storage means and said sample signal generating means, for receiving and sampling and holding the luminance signal in response to each generated and output sampling signal;
   computing means, responsive to each sample and held luminance signal, for determining one of said plurality of variable focusing positions necessary to achieve optimal focusing of said desired scene; and
   control means, responsive to said determination by said computing means, for controlling said drive means to vary the focusing position of said optical lens system to achieve optimal automatic focusing.

16. The apparatus of claim 15, wherein said sample and hold means obtains an instantaneous DC value of said luminance signal in response to each generated and output sampled signal.

17. The apparatus of claim 16, further including:
   integration means, operatively connected to said sample and hold means and said computing means, for integrating each said sampled and held signal into evaluation data, and outputting said evaluation data to said computing means.

18. The apparatus of claim 17, wherein said computing means receives and compares said evaluation data, for each said sampled and held luminance signal, to each immediately preceding evaluation data, to determine said one of a plurality of variable focusing positions.

19. The apparatus of claim 18, wherein said determination made by said computing means is one of direction only, said control means controlling said drive means to vary the focusing position by a constant magnitude and variable direction.

20. The apparartus of claim 15, further comprising:
   synchronization processing means, operatively connected to said sample signal generating means and said scanning means, for separating said synchronization signal into a vertical synchronization signal, representative of actual vertical scanning conditions of the scanning means, and a horizontal synchronization signal, representative of actual horizontal scanning conditions of the scanning means;
   said sample signal generating means receiving each said horizontal and vertical synchronization signals and comparing them to a predetermined plurality of linearly arranged sampling points and generating and outputting sampled signal upon one of said plurality of linearly arranged sampling points intersecting both said horizontal and vertical synchronization signals, each intersection corresponding to one of said plurality of scan lines.

21. The apparatus of claim 20, wherein the scanning means raster scans the desired scene and generates said video signal in an interlaced manner constituted by a pair of interlaced alternating fields.

22. The apparatus of claim 21, wherein said temporary storage means, synchronization processing means, sample signal generating means, sample and hold means, computing means, and control means each perform respective operations for each one of said pair of alternating fields.

23. The apparatus of claim 22, wherein said sample signal generating means compares said received horizontal and vertical signals to a first predetermined plurality of linearly arranged sampling points in a first one of said pair of alternating fields and to a second predetermined plurality of linearly arranged sampling points in a second one of said pair of alternating fields.

24. The apparatus of claim 23, wherein said second predetermined plurality of linearly arranged sampling points is substantially perpendicular to said first predetermined plurality of linearly arranged sampling points.

25. The apparatus of claim 24, wherein said first and second predetermined plurality of linearly arranged sampling points are linearly arranged on substantially perpendicular diagonal lines of the picture plane of the desired scene represented by the video signal.

26. The apparatus of claim 25, wherein said sample and hold means obtains an instanteous DC value of said luminance signal in response to each generated and output sampled signal.

27. The apparatus of claim 25, further including:
integration means, operatively connected to said sample and hold means and said conputing means, for integrating each said sampled and held signal into evaluation data, and outputting said evaluation data to said computing means.

28. The apparatus of claim 27, wherein said computing means receives and compares said evaluation data, for each said sample and held luminance signal, to each immediately preceding evaluation data, to determine sand one of a plurality of variable focusing positions.

29. The apparatus of claim 28, wherein said determination made by said computing means is one of direction only, said control means controlling said drive means to vary the focusing position by a constant magnitude and variable direction.

30. An automatic focusing method, comprising the steps of:
(a) raster scanning, with a plurality of scan lines, a desired scene through an optical lens system and generating and separating a video signal representative of said desired scene, into a luminance signal and a synchronizing signal, and outputting said signals;
(b) temporarily storing said luminance signal,
(c) comparing said synchronizing signal, representative of the actual scanning conditions, to a predetermined plurality of linearly arranged sampling points to generate and output sampling signals, one upon each of said plurality of scan lines intersecting one of said plurality of linearly arranged sampling points;
(d) sampling and holding the luminance signal in response to each generated and output sampled signal;
(e) determining one of a plurality of variable focusing positions to focus said optical lens system, in response to each sampled and held luminance signal, to achieve optical focusing of said desired scene; and
(f) controlling a drive means to vary the focusing position of said optical lens system to achieve optimal automatic focusing, in response to the determination of step (e).

31. The method of claim 30, wherein in said step (d) an instantaneous DC value of said luminance signal is obtained in response to each generated and output sampled signal.

32. The method of claim 30, further including the step of:
(g). integrating each said sample and held signal of step (d) into evaluation data, and outputting said evaluation data for determination of step (e).

33. The method of claim 31, wherein step (e) further includes:
comparing said evaluation data, for each sample and held luminance signal, to each immediately preceding evaluation data, to determine said one of a plurality of variable focusing positions.

34. The method of claim 33, wherein said determination of said step (e) is one of direction only, said controlling of said drive means varying only in direction, said drive means being driven with a constant magnitude.

35. The method of claim 30, further comprising the step of:
(g) separating said synchronization signal into a vertical synchronization signal, representative of actual vertical scanning conditions of the scanning means, and a horizontal synchronization signal, representative of actual horizontal scanning conditions of the scanning means prior to step (c); wherein
said horizontal and vertical synchronization signals are compared, in said step (c), to a predetermined plurality of linearly arranged sampling points, and
sampled signals are generated and output upon one of said plurality of linearly arranged sampling points intersecting both said horizontal and vertical synchronization signals, each intersection corresponding to one of said plurality of scan lines.

36. The method of claim 35, wherein the scanning of the desired scene and generation of said video signal in said step (a) occurs in an interlaced manner constituted by a pair of interlaced alternating fields.

37. The method of claim 36, wherein said steps (a)–(g) each occur for each one of said pair of interlaced alternating fields.

38. The method of claim 37, wherein said step (c) of comparing compares said received horizontal and vertical signals to a first predetermined plurality of linearly arranged sampling points in a first one of said pair of alternating fields and to a second predetermined plurality of linearly arranged sampling points in a second one of said pair of alternating fields.

39. The method of claim 38, wherein said second predetermined plurality of linearly arranged sampling points is substantially perpendicular to said first predetermined plurality of linearly arranged sampling points.

40. The method of claim 39 wherein said first and second predetermined plurality of linearly arranged sampling points are linearly arranged on substantially perpendicularly diagonal lines of the picture plane of the desired scene represented by the video signal.

41. The method of claim 40, wherein in said step (d) an instantaneous DC value of said luminance signal is obtained in response to each generated and output sampled signal.

42. The method of claim 40, further including the step of:
(h) integrating each said sampled and held signal of said step (d) into evaluation data, and outputting said evaluation data for determination of step (e).

43. The method of claim 42, wherein said step (e) further includes
comparing said evaluation data, for each said sample and held luminance signal, to each immediately preceding evaluation data, to determine said one of a plurality of variable focusing positions.

44. The method of claim 43, wherein said determination of said step (e) is one of direction only, said controlling of said drive means varying in direction only, said drive means being driven with a constant magnitude.

* * * * *